(12) United States Patent
Xie

(10) Patent No.: US 9,778,519 B2
(45) Date of Patent: Oct. 3, 2017

(54) LIQUID-CRYSTAL DISPLAY PANEL AND DEVICE

(71) Applicants: SHENZHEN CHINA STAR OPTOELECTRONICS TECHNOLOGY CO., LTD., Guangdong (CN); WUHAN CHINA STAR OPTOELECTRONICS TECHNOLOGY CO., LTD., Wuhan, Hubei (CN)

(72) Inventor: Chang Xie, Shenzhen (CN)

(73) Assignees: SHENZHEN CHINA STAR OPTOELECTRONICS TECHNOLOGY CO., LTD., Shenzhen (CN); WUHAN CHINA STAR OPTOELECTRONICS TECHNOLOGY CO., LTD., Wuhan (CN)

( * ) Notice: Subject to any disclaimer, the term of this patent is extended or adjusted under 35 U.S.C. 154(b) by 277 days.

(21) Appl. No.: 14/650,643

(22) PCT Filed: Apr. 28, 2015

(86) PCT No.: PCT/CN2015/077612
§ 371 (c)(1),
(2) Date: Jun. 9, 2015

(87) PCT Pub. No.: WO2016/172833
PCT Pub. Date: Nov. 3, 2016

(65) Prior Publication Data
US 2017/0146870 A1    May 25, 2017

(30) Foreign Application Priority Data

Apr. 27, 2015   (CN) .......................... 2015 1 0202597

(51) Int. Cl.
*G02F 1/1334*   (2006.01)
*G02F 1/1343*   (2006.01)
(Continued)

(52) U.S. Cl.
CPC .. *G02F 1/134363* (2013.01); *G02F 1/133514* (2013.01); *G02F 1/133528* (2013.01);
(Continued)

(58) Field of Classification Search
CPC ......... G02F 1/134301; G02F 1/134336; G02F 2001/134381; G02F 1/136259; G02F 1/136204
See application file for complete search history.

(56) References Cited

U.S. PATENT DOCUMENTS

2005/0083466 A1    4/2005  Lee et al.
2007/0146607 A1*   6/2007  Lee .................. G02F 1/134363
                                                          349/141
(Continued)

FOREIGN PATENT DOCUMENTS

CN       1607441 A     4/2005
CN     103529607 A     1/2014

*Primary Examiner* — Phu Vu
(74) *Attorney, Agent, or Firm* — Sughrue Mion, PLLC

(57) ABSTRACT

A liquid-crystal display panel and device are provided. The display panel includes: a first substrate including a first common electrode; a second substrate disposed opposite to the first substrate, including a second common electrode and a pixel electrode; and a liquid-crystal layer disposed between the first substrate and the second substrate. A projection of the pixel electrode on the first substrate does not overlap with a pattern of the first common electrode on the first substrate.

16 Claims, 4 Drawing Sheets

(51) Int. Cl.
*G02F 1/1335* (2006.01)
*G02F 1/1333* (2006.01)

(52) U.S. Cl.
CPC ............ *G02F 2001/133357* (2013.01); *G02F 2001/134318* (2013.01); *G02F 2201/121* (2013.01); *G02F 2201/123* (2013.01)

(56) References Cited

U.S. PATENT DOCUMENTS

| | | |
|---|---|---|
| 2013/0300994 A1 | 11/2013 | Wu et al. |
| 2014/0198271 A1* | 7/2014 | Kizu .................... G02F 1/1337 349/15 |
| 2016/0018704 A1 | 1/2016 | Xie et al. |

* cited by examiner

LIQUID-CRYSTAL DISPLAY PANEL AND DEVICE

TECHNICAL FIELD OF THE INVENTION

The present invention relates to a liquid-crystal technology, and in particular to a liquid-crystal display (LCD) panel and device.

BACKGROUND OF THE INVENTION

A conventional LCD panel, which is shown in FIG. 1, includes a first substrate 20, a second substrate 10, and a liquid-crystal (LC) layer 30. The first substrate 20 includes a first common electrode 21. The second substrate 10 and the first substrate 20 are disposed opposite to each other, and the second substrate 10 includes a second common electrode 12 and a pixel electrode 11. The LC layer 30 is located between the first substrate 20 and the second substrate 10. Initial orientation of the liquid-crystal molecules is vertical.

When a voltage is applied, a horizontal electric field is formed between a portion of the first common electrode 21 that is not directly opposite to the pixel electrode 11 and the pixel electrode 11, as shown in a dashed box 102 of FIG. 2. However, a vertical electric field is easily formed between a portion of the first common electrode 21 that is directly opposite to the pixel electrode 11 and the pixel electrode 11, as shown in a dashed box 101 of FIG. 2. Due to the existence of the vertical electric field, it is a disadvantage to the twist of the liquid-crystal molecules. In order to make the liquid-crystal molecules twist, it requires a higher driving voltage, but that also reduces light efficiency.

Therefore, there is a significant need to provide a liquid-crystal display panel and device for solving the problems existing in the prior art.

SUMMARY OF THE INVENTION

An objective of the present invention is to provide a liquid-crystal display panel and device for overcoming the technical problems that the prior art LCD panel requires a higher driving voltage and has a lower light efficiency.

In order to solve the above-mentioned problems, the present invention provides a liquid-crystal display panel, which includes: a first substrate comprising a first common electrode and a planarization layer; a second substrate disposed opposite to the first substrate, comprising a second common electrode and a pixel electrode; and a liquid-crystal layer disposed between the first substrate and the second substrate; wherein a projection of the pixel electrode on the first substrate does not overlap with a pattern of the first common electrode on the first substrate, and the pixel electrode is spiral.

In the liquid-crystal display panel of the present invention, the first substrate is a color filter (CF) substrate, and the second substrate is an array substrate.

In the liquid-crystal display panel of the present invention, there is a first polarizer disposed on an outside of the first substrate.

In the liquid-crystal display panel of the present invention, there is a second polarizer disposed on an outside of the second substrate.

The present invention further provides a liquid-crystal display device, which includes: a backlight module and a liquid-crystal display panel. The liquid-crystal display panel herein includes: a first substrate comprising a first common electrode; a second substrate disposed opposite to the first substrate, comprising a second common electrode and a pixel electrode; and a liquid-crystal layer disposed between the first substrate and the second substrate; wherein a projection of the pixel electrode on the first substrate does not overlap with a pattern of the first common electrode on the first substrate.

In the liquid-crystal display device of the present invention, the pixel electrode is spiral.

In the liquid-crystal display device of the present invention, the pixel electrode comprises a common portion and a plurality of branch portions, and one end of each branch portion is coupled to the common portion.

In the liquid-crystal display device of the present invention, an angle defined between an extended line of the common portion and an extended line of the branch portion is larger than 0 degrees and less than 90 degrees.

In the liquid-crystal display device of the present invention, the pixel electrode includes a common portion and a plurality of branch portions. The common portion includes a first common portion and a second common portion corresponding to each other. The branch portions are located between the first common portion and the second common portion, and the branch portion includes a first branch portion and a second branch portion. One end of the first branch portion is coupled to the first common portion; the other end of the first branch portion is coupled to one end of the second branch portion; the other end of the second branch portion is coupled to the second common portion.

In the liquid-crystal display device of the present invention, an angle defined between an extended line of the first common portion and an extended line of the first branch portion is larger than 0 degrees and less than 90 degrees; an angle defined between an extended line of the second common portion and an extended line of the second branch portion is larger than 0 degrees and less than 90 degrees.

In the liquid-crystal display device of the present invention, an angle defined between an extended line of the first branch portion and an extended line of the second branch portion is larger than 0 degrees and less than 90 degrees.

In the liquid-crystal display device of the present invention, the pixel electrode includes a common portion and a plurality of branch portions. The common portion includes a first common portion and a second common portion corresponding to each other. The branch portions are located between the first common portion and the second common portion, and the branch portions comprising a first branch portion, a second branch portion, a third branch portion, and a fourth branch portion. One end of the first branch portion is coupled to the first common portion; the other end of the first branch portion is coupled to one end of the second branch portion; the other end of the second branch portion is coupled to one end of the third branch portion; the other end of the third branch portion is coupled to one end of the fourth branch portion; the other end of the fourth branch portion is coupled to the second common portion.

In the liquid-crystal display device of the present invention, an angle defined between an extended line of the first common portion and an extended line of the first branch portion is larger than 0 degrees and less than 90 degrees; an angle defined between an extended line of the second common portion and an extended line of the fourth branch portion is larger than 0 degrees and less than 90 degrees.

In the liquid-crystal display device of the present invention, the first substrate is a color filter (CF) substrate, and the second substrate is an array substrate.

In the liquid-crystal display device of the present invention, there is a first polarizer disposed on an outside of the first substrate.

In the liquid-crystal display device of the present invention, there is a second polarizer disposed on an outside of the second substrate.

The liquid-crystal display panel and device of the present invention retain the common electrode on the first substrate that is not directly opposite to the pixel electrode by means of removing the common electrode that is directly opposite to the pixel electrode. Accordingly, the vertical electric field, which is formed by the pixel electrode and the portion of the first common electrode that is directly opposite thereto, can be decreased, and the strength of the horizontal electric field within the liquid-crystal display panel is enhanced. Furthermore, the driving voltage of the liquid-crystal display panel is reduced, and the light efficiency is enhanced.

It is to be understood that both the foregoing general description and the following detailed description of the present invention are exemplary and explanatory and are intended to provide further explanation of the invention as claimed.

DETAILED DESCRIPTION OF THE INVENTION

Figure 1:
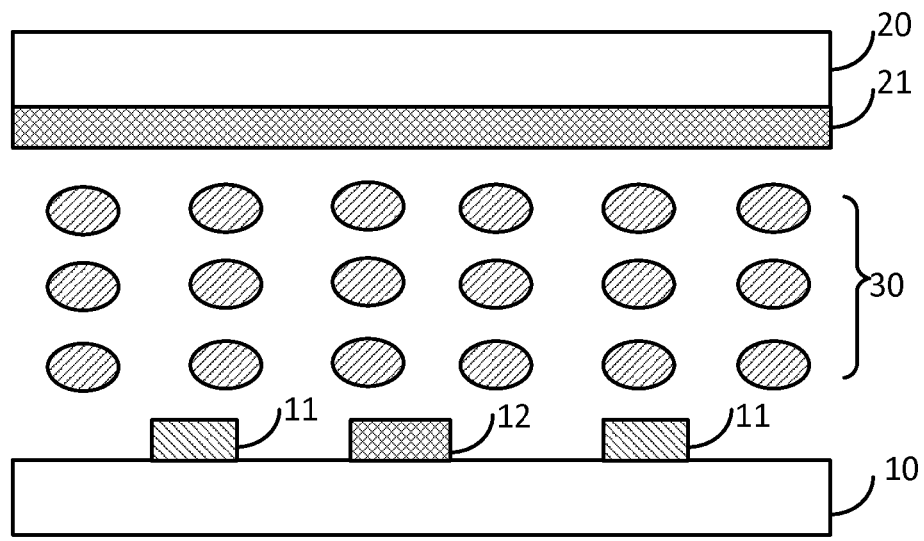
FIG. 1 is a schematic drawing illustrating a LCD panel in the prior art.
Figure 2:
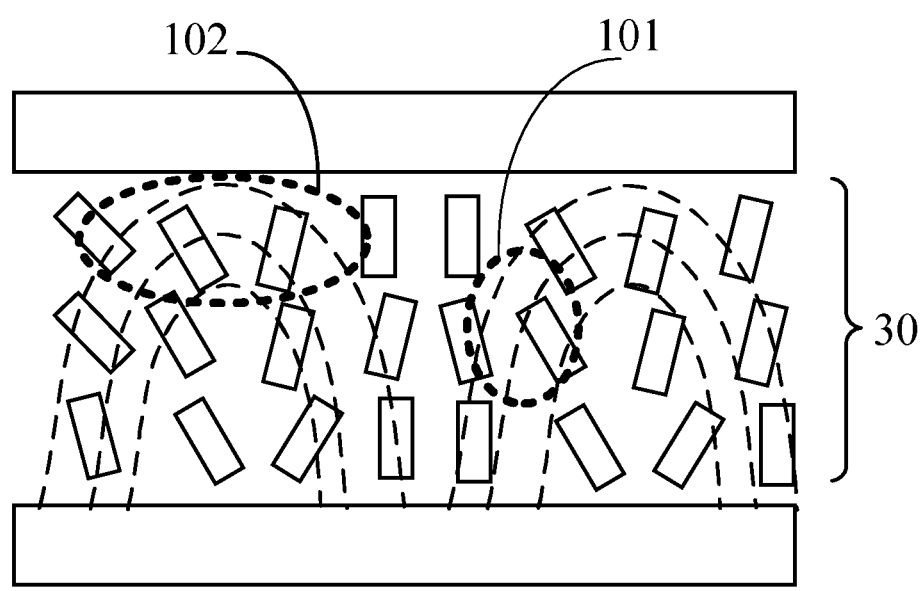
FIG. 2 is a simulated diagram illustrating an electric field when a voltage is applied to the prior art LCD panel.

Descriptions of the following embodiments refer to attached drawings which are utilized to exemplify specific embodiments. Directional terms mentioned in the present invention, such as "top" and "down", "front", "rear", "left", "right", "inside", "outside", "side" and so on are only directions with respect to the attached drawings. Therefore, the used directional terms are utilized to explain and understand the present invention but not to limit the present invention.

In different drawings, the same reference numerals refer to like parts throughout the drawings.

Figure 3:
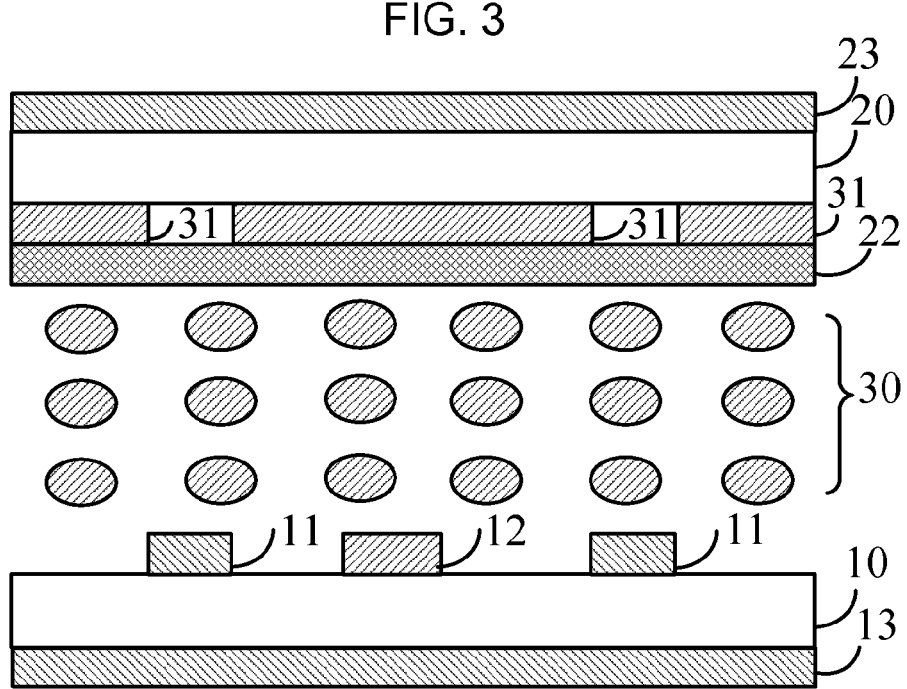
FIG. 3 is a schematic drawing illustrating a liquid-crystal display panel of the present invention.

Referring to FIG. 3, FIG. 3 is a schematic drawing illustrating a liquid-crystal display panel of the present invention.

Figure 4:
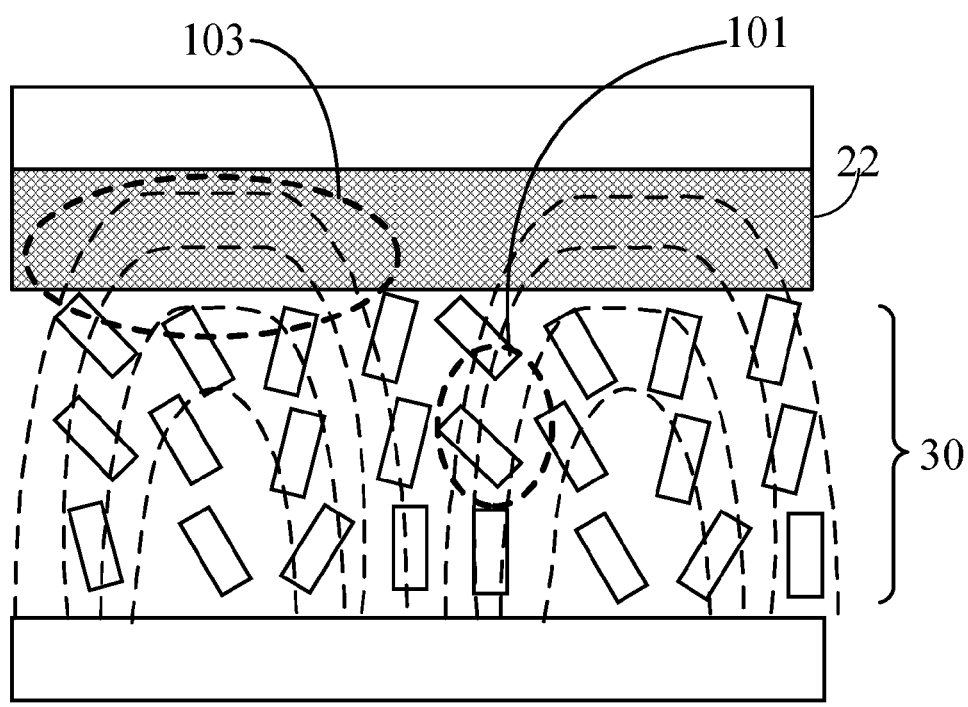
FIG. 4 is a simulated diagram illustrating a preferable electric field when a voltage is applied to a liquid-crystal display panel of the present invention.

The liquid-crystal display panel of the present invention includes: as shown in FIG. 3, a first substrate 20 that includes first common electrodes 31, a second substrate 10 that is disposed opposite to the first substrate 20 including second common electrodes 12 and pixel electrodes 11, and an LC layer 30 located between the first substrate 20 and the second substrate 10. There are a first polarizer 23 and a second polarizer 13 which are disposed respectively on the outsides of the first substrate 20 and the second substrate 10. In order to increase a range of the horizontal electric field, a planarization layer 22 can further be disposed on the first substrate. Under this condition, the range of the horizontal electric field is illustrated in a dashed box 103 of FIG. 4.

A projection of the pixel electrode 11 on the first substrate 20 does not overlap with a pattern of the first common electrode 31 on the first substrate 20. That is, the portion of the first common electrode 31 that is directly opposite to the pixel electrode 11 is removed, and the portion of the first common electrode 31 that is not directly opposite to the pixel electrode 11 is retained. The first substrate can be a color filter (CF) substrate, and the second substrate can be an array substrate.

When no voltage is applied, the initial orientation of the liquid-crystal molecules is vertical. When a voltage is applied, since the first common electrode 31 is not directly opposite to the pixel electrode 11, a horizontal electric field is formed. Since the first common electrode 31 that is directly opposite to the pixel electrode 11 does not exist, the vertical electric field is not generated, thereby facilitating the liquid-crystal molecules to twist. The liquid-crystal molecules can be twisted without a higher driving voltage can deflect, as well as the light efficiency is enhanced.

Figure 5:
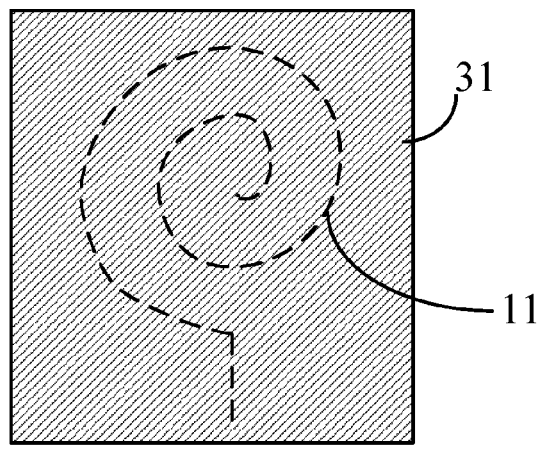
FIG. 5 is a schematic drawing illustrating a first LCD panel of the present invention.

Furthermore, as shown in FIG. 5, the pixel electrode 11 is spiral—a spiral portion as shown in a dashed line of the drawing. Meanwhile, a shape of the first common electrode 31 is the portion that corresponds to a portion outside the spiral pixel electrode 11—the region outside the spiral pixel electrode of the drawing. By utilizing the above pixel electrode structure, it is capable of generating the electric field with more directions, so that the liquid-crystal molecules have various twist angles for facilitating multi-domain display and broadening the viewing angle of the liquid-crystal display panel.

Furthermore, the pixel electrode 11 includes at least two pixel electrode spiral pitches, and any two of the pixel electrode spiral pitches are not all equal. When the pixel electrode spiral pitches are not all equal, it is capable of making the electric field formed within the spiral threads different, thereby being able to obtain the electric field with more directions, facilitating the liquid-crystal molecules to twist toward more directions for expanding the viewing angle.

Furthermore, the pixel electrode spiral pitches are greater than or equal to 2 microns and less than or equal to 8 microns. When the pixel electrode spiral pitches are excessively small, the electric field between each spiral thread will appear interference; when the pixel electrode spiral pitch is too large, the electric field intensity generated between each spiral thread is insufficient, so that the liquid-crystal molecules cannot be twisted.

Preferably, the second common electrode 12 also includes at least two common electrode spiral pitches, and any two of the common electrode spiral pitches are not all equal. The number of the spiral pitches of the common electrode 12 is equal to the number of the spiral pitches of the pixel electrode 11. The common electrode spiral pitches are greater than or equal to 2 microns and less than or equal to 8 microns.

Figure 6:
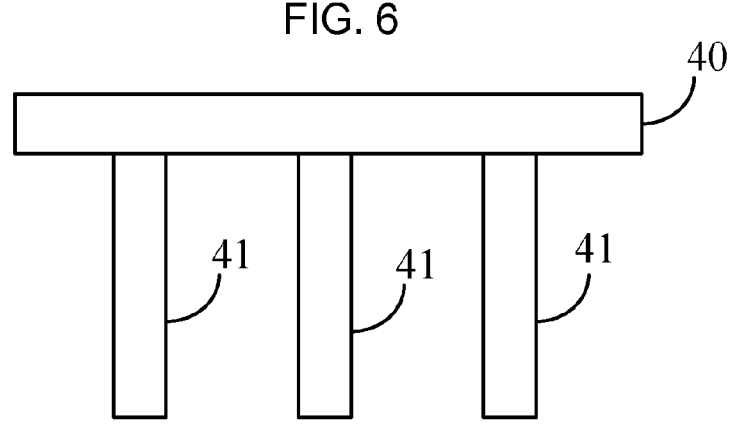
FIG. 6 is a schematic drawing illustrating a second LCD panel of the present invention.

Furthermore, as shown in FIG. 6, the pixel electrode 11 includes a common portion 40 and a plurality of branch portions 41, and one end of each branch portion 41 is coupled to the common portion 40. Using this pixel electrode structure can reduce the driving voltage of the liquid-crystal display panel to improve light efficiency. Meanwhile, the shape of the first common electrode 31 is the portion that corresponds to a portion outside the pixel electrode 11. Preferably, an angle defined between an extended line of the common portion 40 and an extended line of the branch portion 41 is larger than 0 degrees and less than 90 degrees, more preferably greater than 30 degrees and less than 60 degrees, more preferably 45 degrees.

Figure 7:
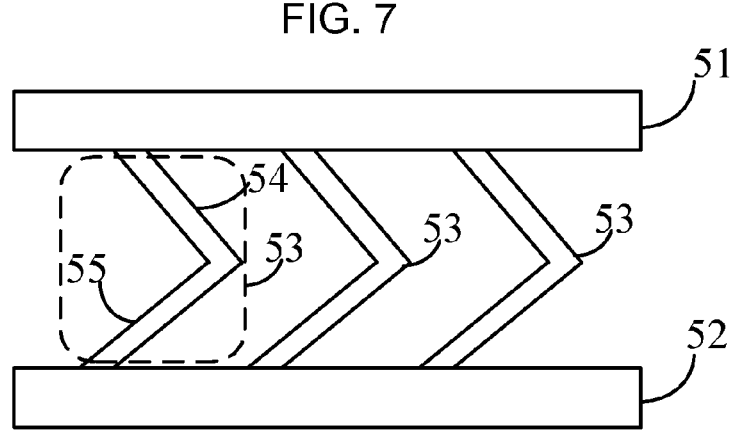
FIG. 7 is a schematic drawing illustrating a third LCD panel of the present invention.

Furthermore, as shown in FIG. 7, the pixel electrode 11 includes a common portion and a plurality of branch portions 53. The common portion includes a first common portion 51 and a second common portion 52 corresponding to each other, and the branch portions 53 are located between the first common portion 51 and the second common portion 52. The branch portion 53 is substantially a ">" shape, and it includes a first branch portion 54 and a second branch portion 55. One end of the first branch portion 54 is coupled to the first common portion 51. The other end of the first branch portion 54 is coupled to one end of the second branch portion 55 and shows at a certain angle. The other end of the second branch portion 55 is coupled to the second common portion 52. Using this pixel electrode structure can generate the electric field with more directions in comparison with the pixel electrode in FIG. 6, further facilitating the formation of the multi-domain display and better broadening the viewing angle of the liquid-crystal display panel. Meanwhile, the shape of the first common electrode 31 is the portion that corresponds to a portion outside the pixel electrode 11. An angle defined between an extended line of the first common portion 51 and an extended line of the first branch portion 54 is larger than 0 degrees and less than 90 degrees, preferably greater than 30 degrees and less than 60 degrees, more preferably 45 degrees. An angle defined between an extended line of the second common portion 52 and an extended line of the second branch portion 55 is larger than 0 degrees and less than 90 degrees, preferably greater than 30 degrees and less than 60 degrees, more preferably 45 degrees.

Figure 8:
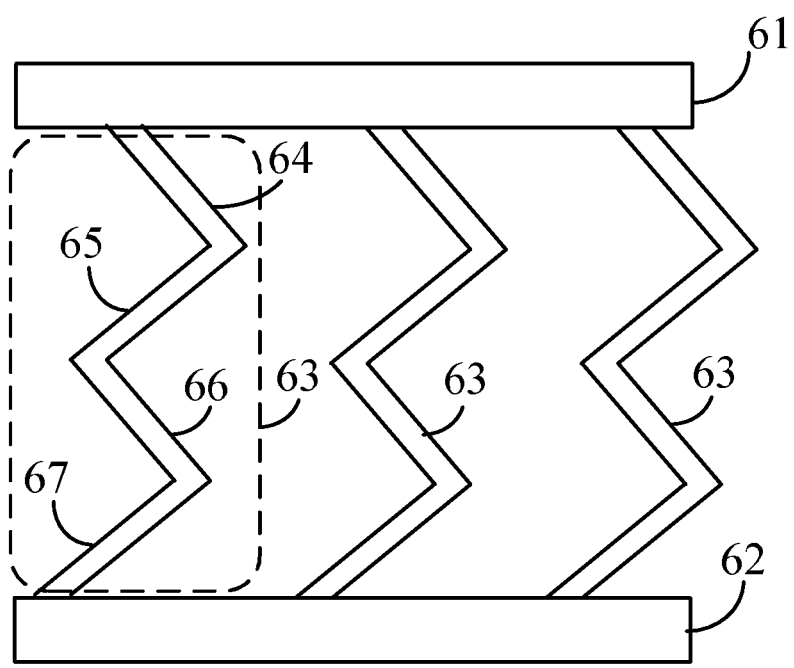
FIG. 8 is a schematic drawing illustrating a fourth LCD panel of the present invention.

Furthermore, as shown in FIG. 8, the pixel electrode 11 includes a common portion and a plurality of branch portions 63. The common portion includes a first common portion 61 and a second common portion 62 corresponding to each other, and the branch portions 63 are located between the first common portion 61 and the second common portion 62. The branch portion 63 substantially shows a "w" shape longitudinally aligned, which corresponds to the structure of the two coupled ">" shapes in FIG. 7. The branch portions 63 include a first branch portion 64, a second branch portion 65, a third branch portion 66, and a fourth branch portion 67. One end of the first branch portion 64 is coupled to the first common portion 61; the other end of the first branch portion 64 is coupled to one end of the second branch portion 65; the other end of the second branch portion 65 is coupled to one end of the third branch portion 66; the other end of the third branch portion 66 is coupled to one end of the fourth branch portion 67; the other end of the fourth branch portion 67 is coupled to the second common portion 62. Using this pixel electrode structure can generate the electric field with more directions in comparison with the pixel electrode in FIG. 7, further facilitating the formation of the multi-domain display and better broadening the viewing angle of the liquid-crystal display panel. Meanwhile, the shape of the first common electrode 31 is the portion that corresponds to a portion outside the pixel electrode 11. An angle defined between an extended line of the first common portion 61 and an extended line of the first branch portion 64 is larger than 0 degrees and less than 90 degrees, preferably greater than 30 degrees and less than 60 degrees, more preferably 45 degrees. An angle defined between an extended line of the second common portion 62 and an extended line of the fourth branch portion 67 is larger than 0 degrees and less than 90 degrees, preferably greater than 30 degrees and less than 60 degrees, more preferably 45 degrees. An angle defined between an extended line of the first branch portion and an extended line of the second branch portion 65 is larger than 0 degrees and less than 90 degrees, preferably greater than 30 degrees and less than 60 degrees. An angle defined between an extended line of the second branch portion 65 and an extended line of the third branch portion 66 is larger than 0 degrees and less than 90 degrees, preferably greater than 30 degrees and less than 60 degrees. An angle defined between an extended line of the third branch portion 66 and an extended line of the fourth branch portion 67 is larger than 0 degrees and less than 90 degrees, preferably greater than 30 degrees and less than 60 degrees. When the pixel electrode has the above angles, the viewing angle can be increased preferably, to further enhance the display effect.

The liquid-crystal display panel of the present invention retains the portion of the common electrode on the first substrate that is not directly opposite to the pixel electrode by means of removing the portion of the common electrode that is directly opposite to the pixel electrode. Accordingly, the vertical electric field, which is formed by the pixel electrode and the portion of the first common electrode that is directly opposite thereto, can be decreased, and the strength of the horizontal electric field within the liquid-crystal display panel is enhanced. Furthermore, the driving voltage of the liquid-crystal display panel is decreased, and the light efficiency is enhanced.

The present invention further provides a liquid-crystal display device, which includes a backlight module and a liquid-crystal display panel. In conjunction with FIG. 3, the liquid-crystal display panel herein includes: a first substrate 20 including a first common electrode 31; a second substrate 10 disposed opposite to the first substrate 20, the second substrate 10 including a second common electrode 12 and a pixel electrode 11; and an LC layer 30 disposed between the first substrate 20 and the second substrate 10; in which the projection of the pixel electrode 11 on the first substrate 20 does not overlap with the pattern of the first common electrode 31 on the first substrate 20.

Preferably, in conjunction with FIG. 5, the pixel electrode 11 is spiral.

Preferably, in conjunction with FIG. 6, the pixel electrode 11 includes a common portion 40 and a plurality of branch portions 41, and one end of each branch portion 41 is coupled to the common portion 40.

Preferably, in conjunction with FIG. 7, the pixel electrode 11 includes a common portion and a plurality of branch portions 53. The common portion includes a first common portion 51 and a second common portion 52 corresponding to each other, and the branch portions 53 are located between the first common portion 51 and the second common portion 52. The branch portions 53 include a first branch portion 54 and a second branch portion 55. One end of the first branch portion 54 is coupled to the first common portion 51; the other end of the first branch portion 54 is coupled to one end of the second branch portion 55; the other end of the second branch portion 55 is coupled to the second common portion 52.

Preferably, in conjunction with FIG. 8, the pixel electrode 11 includes a common portion and a plurality of branch portions 63. The common portion includes a first common portion 61 and a second common portion 62 corresponding to each other, and the branch portions 63 are located between the first common portion 61 and the second common portion 62. The branch portions 63 include a first branch portion 64, a second branch portion 65, a third branch portion 66, and a fourth branch portion 67. One end of the first branch portion 64 is coupled to the first common portion 61; the other end of the first branch portion 64 is coupled to one end of the second branch portion 65; the other end of the second branch portion 65 is coupled to one end of the third branch portion 66; the other end of the third branch portion 66 is coupled to one end of the fourth branch portion 67; the other end of the fourth branch portion 67 is coupled to the second common portion 62.

The liquid-crystal display device of the present invention can comprise any of the above-mentioned LCD panels.

The liquid-crystal display device of the present invention retains the portion of the common electrode on the first substrate that is not directly opposite to the pixel electrode by means of removing the portion of the common electrode that is directly opposite to the pixel electrode. Accordingly, the vertical electric field, which is formed by the pixel electrode and the portion of the first common electrode that is directly opposite thereto, can be decreased, and the strength of the horizontal electric field within the liquid-crystal display panel is enhanced. Furthermore, the driving voltage of the liquid-crystal display panel is decreased, and the light efficiency is enhanced.

While the preferred embodiments of the present invention have been illustrated and described in detail, various modifications and alterations can be made by persons skilled in this art. The embodiment of the present invention is therefore described in an illustrative but not restrictive sense. It is intended that the present invention should not be limited to the particular forms as illustrated, and that all modifications and alterations which maintain the spirit and realm of the present invention are within the scope as defined in the appended claims.

What is claimed is:

1. A liquid-crystal display panel, comprising:
   a first substrate comprising a first common electrode and a planarization layer;
   a second substrate disposed opposite to the first substrate, comprising a second common electrode and a pixel electrode; and
   a liquid-crystal layer disposed between the first substrate and the second substrate;
   wherein a projection of the pixel electrode on the first substrate does not overlap with a pattern of the first common electrode on the first substrate;
   the pixel electrode is spiral.

2. The liquid-crystal display panel according to claim 1, wherein the first substrate is a color filter substrate, and the second substrate is an array substrate.

3. The liquid-crystal display panel according to claim 1, wherein there is a first polarizer disposed on an outside of the first substrate.

4. The liquid-crystal display panel according to claim 1, wherein there is a second polarizer disposed on an outside of the second substrate.

5. A liquid-crystal display device, comprising:
   a backlight module and a liquid-crystal display panel;
   wherein the liquid-crystal display panel comprises:
   a first substrate comprising a first common electrode;
   a second substrate disposed opposite to the first substrate, comprising a second common electrode and a pixel electrode; and
   a liquid-crystal layer disposed between the first substrate and the second substrate;
   wherein a projection of the pixel electrode on the first substrate does not overlap with a pattern of the first common electrode on the first substrate.

6. The liquid-crystal display device according to claim 5, wherein the pixel electrode is spiral.

7. The liquid-crystal display device according to claim 5, wherein the pixel electrode comprises a common portion and a plurality of branch portions, and one end of each branch portion is coupled to the common portion.

8. The liquid-crystal display device according to claim 7, wherein an angle defined between an extended line of the common portion and an extended line of the branch portion is larger than 0 degrees and less than 90 degrees.

9. The liquid-crystal display panel according to claim 5, wherein the pixel electrode comprises a common portion and a plurality of branch portions, the common portion comprising a first common portion and a second common portion corresponding to each other, the branch portions located between the first common portion and the second common portion, the branch portions comprising a first branch portion and a second branch portion, one end of the first branch portion coupled to the first common portion, the other end of the first branch portion coupled to one end of the second branch portion, the other end of the second branch portion coupled to the second common portion.

10. The liquid-crystal display device according to claim 9, wherein an angle defined between an extended line of the first common portion and an extended line of the first branch portion is larger than 0 degrees and less than 90 degrees;
   an angle defined between an extended line of the second common portion and an extended line of the second branch portion is larger than 0 degrees and less than 90 degrees.

11. The liquid-crystal display device according to claim 9, wherein an angle defined between an extended line of the first branch portion and an extended line of the second branch portion is larger than 0 degrees and less than 90 degrees.

12. The liquid-crystal display device according to claim 5, wherein the pixel electrode comprises a common portion and a plurality of branch portions, the common portion comprising a first common portion and a second common portion corresponding to each other, the branch portions located between the first common portion and the second common portion, the branch portions comprising a first branch portion, a second branch portion, a third brand portion, and a fourth branch portion, one end of the first branch portion coupled to the first common portion, the other end of the first branch portion coupled to one end of the second branch portion, the other end of the second branch portion coupled to one end of the third branch portion, the other end of the third branch portion coupled to one end of the fourth branch portion, the other end of the fourth branch portion coupled to the second common portion.

13. The liquid-crystal display device according to claim 12, wherein an angle defined between an extended line of the first common portion and an extended line of the first branch portion is larger than 0 degrees and less than 90 degrees;
   an angle defined between an extended line of the second common portion and an extended line of the fourth branch portion is larger than 0 degrees and less than 90 degrees.

14. The liquid-crystal display device according to claim 5, wherein the first substrate is a color filter (CF) substrate, and the second substrate is an array substrate.

15. The liquid-crystal display device according to claim 5, wherein there is a first polarizer disposed on an outside of the first substrate.

16. The liquid-crystal display device according to claim 5, wherein there is a second polarizer disposed on an outside of the second substrate.

* * * * *